Dec. 3, 1929.  D. G. BUTTS  1,738,282
CASEMENT WINDOW ADJUSTER
Filed June 12, 1928
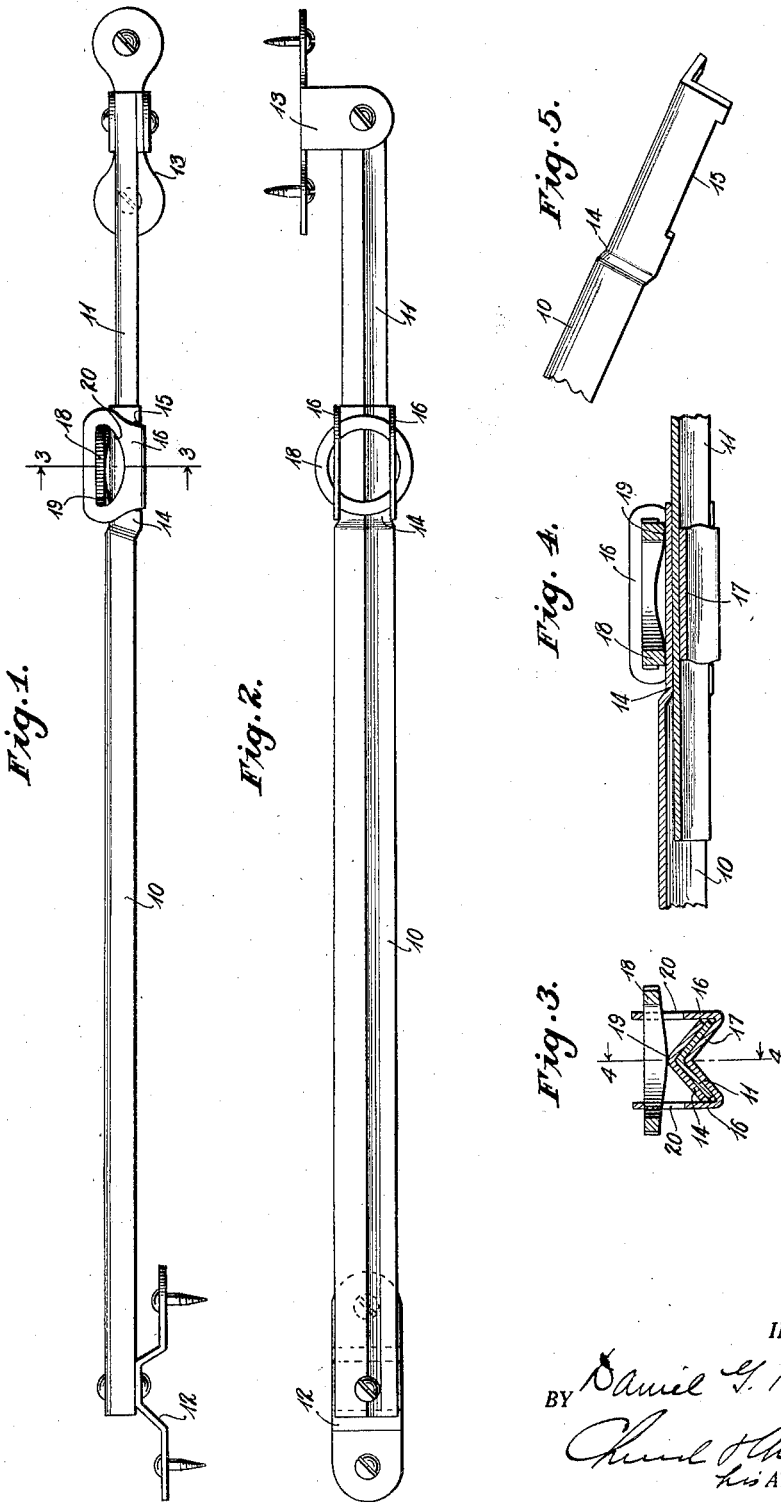
INVENTOR.
BY Daniel G. Butts
his ATTORNEYS Patented Dec. 3, 1929

1,738,282

UNITED STATES PATENT OFFICE

DANIEL G. BUTTS, OF COVINGTON, LOUISIANA

CASEMENT-WINDOW ADJUSTER

Application filed June 12, 1928. Serial No. 284,761.

This invention relates to improvements in casement window adjusters or devices for releasably locking casement windows and the like in any desired position.

Devices of this character usually comprise telescoping members one of which is secured to the window frame and the other to the window sash so that as the window is opened and closed, such telescoping members will slide one within the other. When it is desired to retain the window in a certain position these telescoping members are held against accidental relative movement by a clamp and it is to this last feature that the present invention is more particularly directed.

One object of the invention is to simplify the design and, therefore, the construction of the telescoping members.

A further object is to provide a novel form of clamp for the telescoping members. The present clamp is not only simple in construction but the wedging surfaces are reduced to a minimum so that there is little likelihood of the parts sticking but they can also be easily manipulated in locking and releasing the clamp. The simplicity of this clamp is further reduced by reason of the fact that no fastening means, in the nature of screws or bolts, or the like, are required in attaching it.

With these and other objects in view the invention consists in certain novel details of construction and combinations and arrangements of parts all as will hereinafter be more fully described and the novel features thereof particularly pointed out in the appended claims.

In the accompanying drawings,

Figure 1 is a side view of an adjuster constructed in accordance with the present invention.

Fig. 2 is a top plan view of the same;

Fig. 3 is a cross-section on the line 3—3 of Fig. 1;

Fig. 4 is a longitudinal sectional view on the line 4—4 of Fig. 3; and

Fig. 5 is a detail view of a portion of one of the telescoping members.

In accordance with usual practice the present adjuster comprises two telescoping bars 10, 11, the former being pivoted at one end on a bracket 12 adapted to be attached to the window frame and the other being pivotally attached to a bracket 13 adapted to be secured to the window sash. Bar 11 telescopes within the free end of bar 10, this end of bar 10 being offset as at 14. Both bars are angular in cross-section, preferably being of V-shaped or right angle cross-section as shown. This peculiar cross-section lends the necessary rigidity and strength to the bars even though they are comparatively light. Furthermore, this peculiar cross-section, together with the off-set portion 14 of bar 10, reduces the friction between the bars to a minimum.

The offset end 14 of bar 10 has recesses 15 formed in its opposite side edges for the reception of the side arms 16 of a clamping yoke whose base portion 17 preferably conforms to the cross-section of the bars 10, 11, so as to fit snugly in the angle of bar 11. The shoulders formed on the sides of bar 10 by recesses 15 prevent longitudinal movement of this clamping yoke and said yoke is retained on the two bars by a wedge member preferably in the form of a ring 18, one of whose faces is formed with a camming surface, as at 19. Ring 18 is loose in arms 16 but the diameter of said ring is greater than the length of slots 20 in said arms through which said ring projects so that said ring cannot be removed except by spreading said arms apart.

Ring 18 engages the crest or angle of bar 10 and while the wedging action for forcing the bars against base 17 of the clamping yoke might be generated by having either one of the faces of the ring formed with the camming surface 19, said camming surface is preferably formed on that face of the ring which engages bar 10. In this way, there is only a line contact between the camming member and said bar at the very crest of the bar and as a result these parts are not apt to stick but may be released with comparatively little pressure.

Ring 18 is preferably rotatable in arms 16 of said yoke in a plane transverse of said bar 10 but it will be understood that this transverse movement of the camming surface 19 with respect to bar 10 may be obtained by other than a rotary movement of the wedging member or ring.

The operation of the device will be apparent. To lock the two bars against relative longitudinal movement wedging member 18 is moved relatively to bar 10 so as to bring the high portions of camming surface 19 into engagement with the angle or crest of said bar. This will firmly wedge the two bars between said member and the base 17 of the clamping yoke where they will be securely held until member 18 is again manipulated to disengage the high portions of said surface 19 from bar 10.

What I claim is:

1. In a device of the character described, the combination of a pair of telescoping bars, a clamping yoke having a base portion with arms at opposite sides thereof embracing said telescoping bars, and a rotatable clamping member secured in said side arms, said clamping member having a camming surface adapted to clamp the telescoping bars against the base of said yoke.

2. In a device of the character described, the combination of a pair of telescoping bars, a clamping yoke having a base portion and arms at opposite sides thereof embracing said bars, said yoke arms having alined slots therein, a clamping ring loose in said slots, the length of said slots being less than the diameter of said ring, and a cam surface on said ring engaging one of said bars and adapted to clamp said bars against the base of said yoke.

3. In a device of the character described, the combination of a pair of telescoping bars of right angle cross-section, a yoke having a base conforming to the cross-section of said bars to fit in the angle of one of the bars, and a cam member carried by said yoke and engaging the other bar, said cam member being rotatable in said yoke to force the two bars against the base of the yoke.

4. In a device of the character described, the combination of a pair of telescoping bars of angular cross-section, a yoke having an angular base adapted to fit in the angle of one of said bars, side arms on said yoke, a clamping member loosely retained in said arms and a camming surface on said clamping member bearing against the angle of the other bar at a point in registry with the yoke base.

5. A clamp for casement window adjusters comprising a yoke having a base provided with a clamping surface and side arms each formed with alined slots, and a clamping ring rotatable in said slots extending transversely of said base, said ring having a camming surface opposed to the base of said yoke.

6. A clamp for casement window adjusters consisting of a yoke having a V-shaped base and side arms, a clamping ring rotatably retained in said side arms, and a camming surface on said ring rotatable in a plane disposed transversely of the angle formed in said yoke base.

DANIEL G. BUTTS.